United States Patent [19]

Yamashita et al.

[11] Patent Number: 5,111,447
[45] Date of Patent: May 5, 1992

[54] INTEGRAL PICK UP FOR AN OPTICAL DIGITAL DISC USING SAW DEFLECTION AND LENSE

[75] Inventors: Tsukasa Yamashita, Nara; Nobuhisa Inoue, Kyoto; Mori Kazuhiko, Osaka; Masaharu Matano; Isao Taguchi, both of Nagaokakyo, all of Japan

[73] Assignee: Omron Tateisi Electronics Co., Kyoto, Japan

[21] Appl. No.: 548,203

[22] Filed: Jul. 5, 1990

Related U.S. Application Data

[60] Continuation of Ser. No. 397,635, Aug. 24, 1989, abandoned, which is a continuation of Ser. No. 168,249, Mar. 15, 1988, abandoned, which is a division of Ser. No. 559,060, Oct. 13, 1983, Pat. No. 4,747,090.

[30] Foreign Application Priority Data

Oct. 14, 1982 [JP] Japan .................. 57-180257
Oct. 29, 1982 [JP] Japan .................. 57-190645

[51] Int. Cl.$^5$ .............. G11B 7/135; G11B 7/09; G02B 6/12
[52] U.S. Cl. .............. 369/44.12; 369/112; 385/7; 385/33
[58] Field of Search ............... 369/110-112, 369/120-122, 43, 44.12; 350/96.11, 96.12, 96.13, 96.14, 96.18, 96.19

[56] References Cited

U.S. PATENT DOCUMENTS

| | | | |
|---|---|---|---|
| 3,325,023 | 1/1984 | Matsumoto et al. | 350/96.14 |
| 4,153,821 | 5/1979 | Baer | 369/44 |
| 4,253,723 | 3/1981 | Kojima et al. | 369/112 |
| 4,286,838 | 9/1981 | Huignard et al. | 350/96.12 |
| 4,478,483 | 10/1984 | Spraque | 369/112 |
| 4,747,090 | 5/1988 | Yamashita et al. | 369/45 |

FOREIGN PATENT DOCUMENTS 53-13819 2/1978 Japan .
58-130448 8/1983 Japan .................... 369/112

OTHER PUBLICATIONS

Takizawa, *Electroptic Fresnel Lens-Scanner With An Array of Channel Waveguides*, Applied Optics, vol. 22, No. 16, Aug. 15, 1983, pp. 2468-2473.

Primary Examiner—Stuart S. Levy
Assistant Examiner—James E. Tomassini
Attorney, Agent, or Firm—Cushman, Darby & Cushman

[57] ABSTRACT

A photo-pickup wherein a light emitting portion, a surface acoustic wave generating portion, a lens portion, a light receiving portion and a control portion are integrally integrated on a base plate formed on its surface with a light transmission path. The light emitting portion propagates a light beam to the light transmission path. The light beam propagating in the light transmission path is first deflected within a plane of the light transmission path by surface acoustic wave propagating on the light transmission path and propagated towards the lens portion. The lens portion is provided to project the light beam outside from the light transmission path and effect two-dimentional focusing of the projected beam and adjustment of focal position. The light receiving portion comprises a combination of a plurality of light receiving elements disposed at suitable intervals from the projected position of the light beam to receive a reflected light of the light beam. The control portion is provided to receive an output of the light receiving portion to process a signal and supply said control signal to the surface acoustic wave generating portion and lens portion, thereby effecting the control of deflection angle of the light beam, two-dimensional focusing of the projected beam and control of focal position.

11 Claims, 11 Drawing Sheets

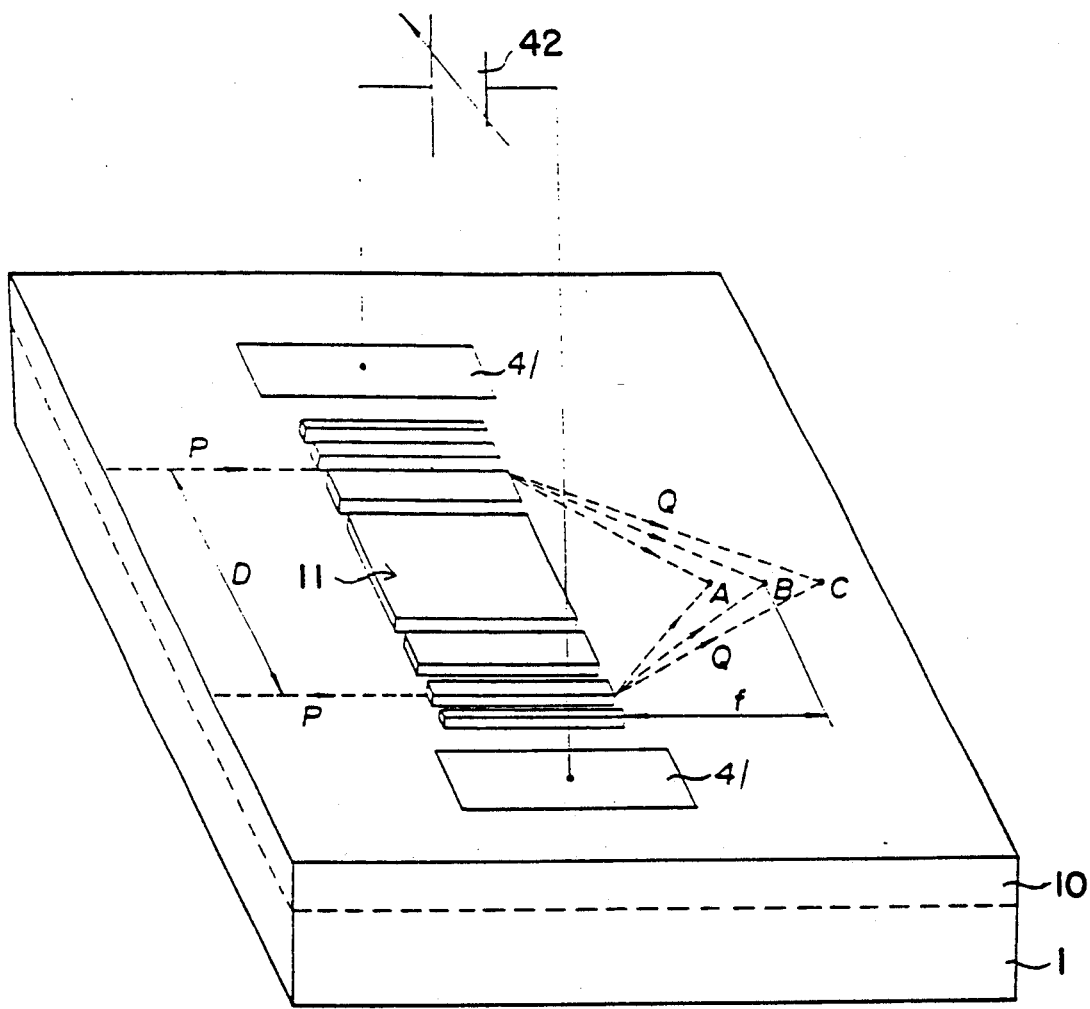
F I G. 5

INTEGRAL PICK UP FOR AN OPTICAL DIGITAL DISC USING SAW DEFLECTION AND LENSE

This is a continuation of application Ser. No. 07/397,635, filed on Aug. 24, 1989, now abandoned which was a continuation of Ser. No. 07/168,249, filed on Mar. 15, 1988, now abandoned which is a divisional of Ser. No. 06/559,060 filed on Oct. 13, 1983, now U.S. Pat. No. 4,747,090.

BACKGROUND OF THE INVENTION

This invention relates to a pickup for a digital disc used in practice as a videodisc, a digital audiodisc and the like, and particularly to a pickup in which elements thereof are integrated to form an integral assembly.

Recently, optical type videodisc systems and optical type videoaudio-disc systems have been put for practical use.

The pickup for an optical type digital disc of this kind have basically comprised a diode laser as a light source, and an optical system composed of various known individual optical parts such as a deflection prism splitter, a ¼ wavelength plate, and an objective lens.

Basically, the optical system comprises an incidence route for condensing and illuminating a laser beam on a disc surface, and a reflection route for guiding a reflection light, whose intensity of light varies with a presence or absence of a pit of the disc, to light receiving elements. Usually, the incidence route and reflection route are designed to be identical with each other and directed oppositely, and the reflection light is separated towards the light receiving element by the action of the ¼ wavelength plate and the deflection prism splitter. That is, a polarized surface of the reflection light, which has passed through the ¼ wavelength plate and reached the deflection prism splitter, is rotated through 90 degrees with respect to a polarized surface of the projected light of a diode laser, and therefore, the reflection light is changed in course by the deflection prism splitter. Theoretically, the deflection prism splitter fully reflects the incident reflection light. There is no reflection light which is a return light to the diode laser.

However, for example, polycarbonate, acryl or the like used to form a transparent base plate of the disc has anistropy and dual reflective characteristic. Therefore, when an incident laser beam whose polarized surface is rotated through 45 degrees at the ¼ wavelength plate is reflected at the surface of the disc, the polarized surface becomes rotated by the dual refraction. Such a reflection light again passes through the ¼ wavelength plate and therefore, the polarized surface of the reflection light arrived at the deflection prism splitter is deviated through a rotated portion by said dual refraction from 90 degrees. That is, the reflection light arrived at the deflection prism splitter partly passes through and is formed into a return light to the diode laser. Such a phenomenon cannot be avoided as far as an optical system is employed in which the incidence route to the disc and reflection route are used in common and the reflection light is separated by the action of the ¼ wavelength palte and deflection prism splitter.

Incidentally, as is known, the diode laser is variously changed in oscillating condition by the incidence of light from the outside. Change in oscillating condition of the diode laser is not preferable for the pickup. This means the deterioration of characteristic of regeneration, and in the digital audiodisc, deterioration in quality of sound often occurs. Of course, this problem can be solved by suitably inclining the incidence of laser light on the disc to vary the incidence route and reflection route. However, in the optical system using individual lens systems or a mirror as in prior arts, if the laser beam is made to be incident obliquely, the number of optical parts increases and optical parts of high density have to be integrated, and therefore, cost increases due to the increase in number of parts and high degree of part-integrating technique is required.

Further, an optical system have to provide a moving mechanism and driving mechanism or to control the focal position in a diametral direction of disc by the lens and control so that the laser beam may be illuminated with accuracy on the disc surface which involves shifting in the direction of thickness. This structure is small in size, and individual optical parts themselves and holders therefore are not compact. Thus, the pickup as a whole is inevitably of the considerably large device and the number of parts increases, resulting in high cost.

SUMMARY OF THE INVENTION

This invention provides a pickup for an optical type digital disc in which elements are integrally integrated, said elements constituting an incidence route from a light emitting portion to a disc and a reflection route from the disc to a light receiving portion.

With this structure, the whole pickup can be formed into a compact and simple configuration. Since the incidence route can be made to be different entirely from the reflection route, unstabilized operation and thus deterioration in reliance of the diode laser can be prevented.

BRIEF DESCRIPTION OF THE DRAWINGS

FIG. 5 is a perspective view showing the state of condensation of light beams in a plane direction by a grating lens which constitutes said lens portion.

DETAILED DESCRIPTION OF THE INVENTION

Figure 1:
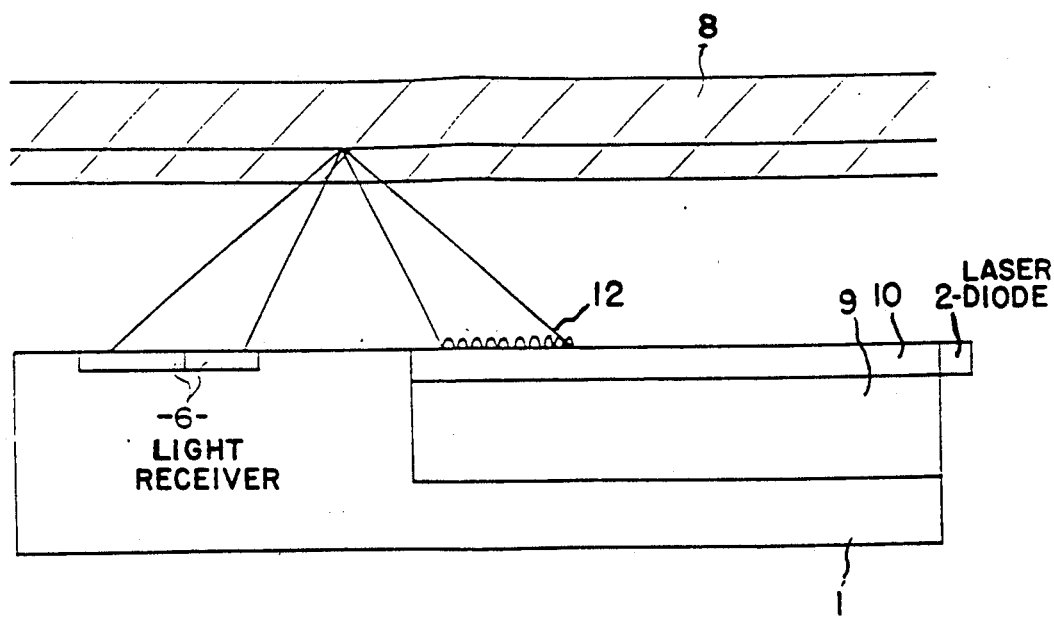
FIG. 1 is a side view showing a pickup for a digital disc in accordance with the first embodiment of the present invention.
Figure 2:
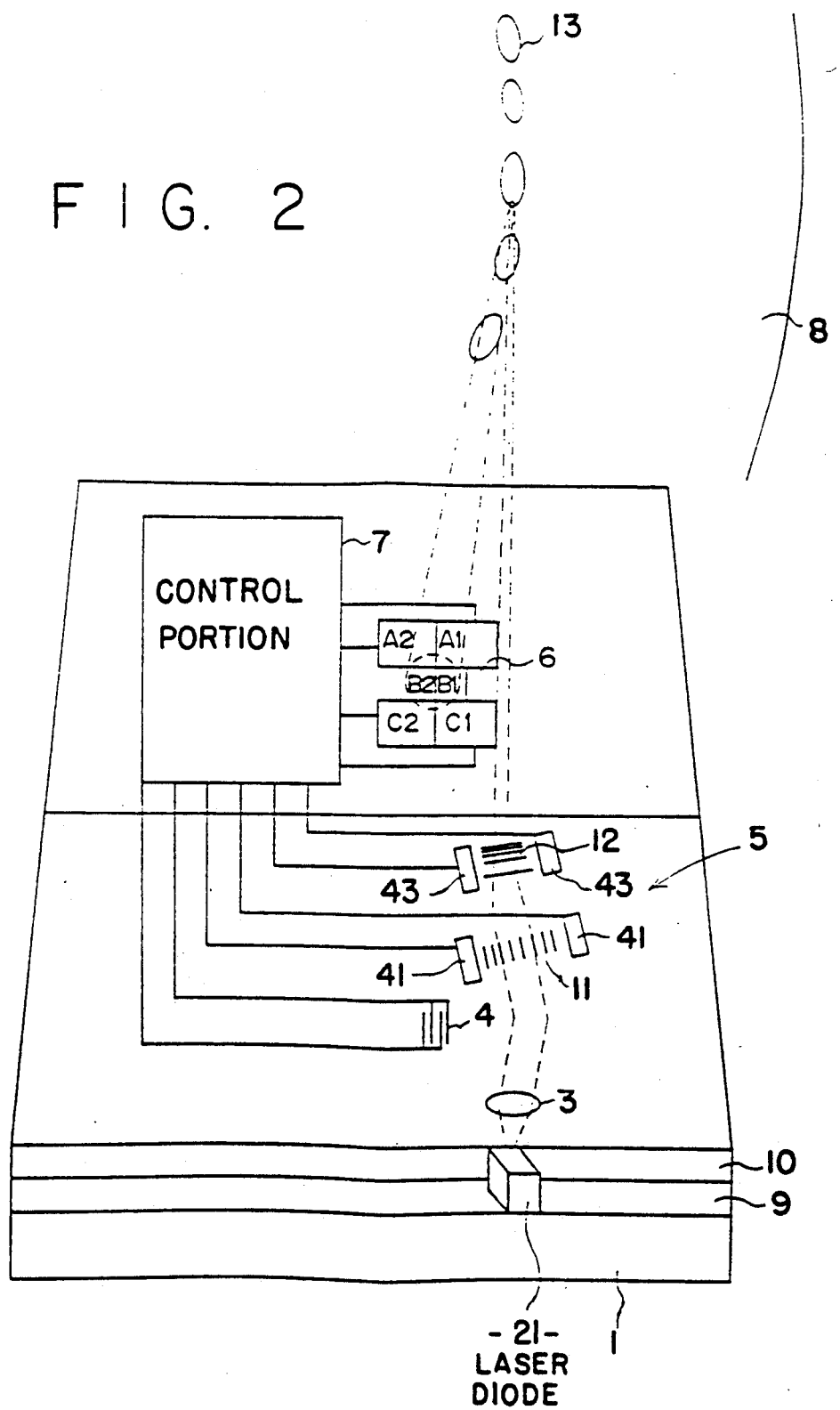
FIG. 2 is a perspective view showing the device of the first embodiment.

FIGS. 1 and 2 show a schematic construction of a pickup in accordance with the first embodiment of the present invention.

In this pickup, a laser diode 2, a collimation lens 3, a surface acoustic wave generating portion 4, a lens portion 5, a light receiving portion 6 and control portion 7 are integrally integrated on a silicon base plate 1. In the pickup, the surface of the silicon base plate 1 is arranged substantially parallel to the surface of a disc 8 so as to project a laser beam obliquely upwardly from the surface of the silicon base plate.

A base plate 9 of $LiNbO_3$ is placed on the side of a light emitting portion 2 on the silicon base plate 1, and a film-like light transmission path 10 is formed by thermal diffusion of titanium (Ti) on the surface of the base plate 9 of $LiNbO_3$.

The laser diode 2 is joined to the end of the transmission path 10, and a laser beam generated from the laser diode 2 propagates in the transmission path 10.

The collimation lens 3 is provided to make a light beam parallel, said light beam being incident in the transmission path 10 from the laser diode 2 to permit the beam to pass frontwardly of the surface acoustic wave generating portion 4.

Figure 3:
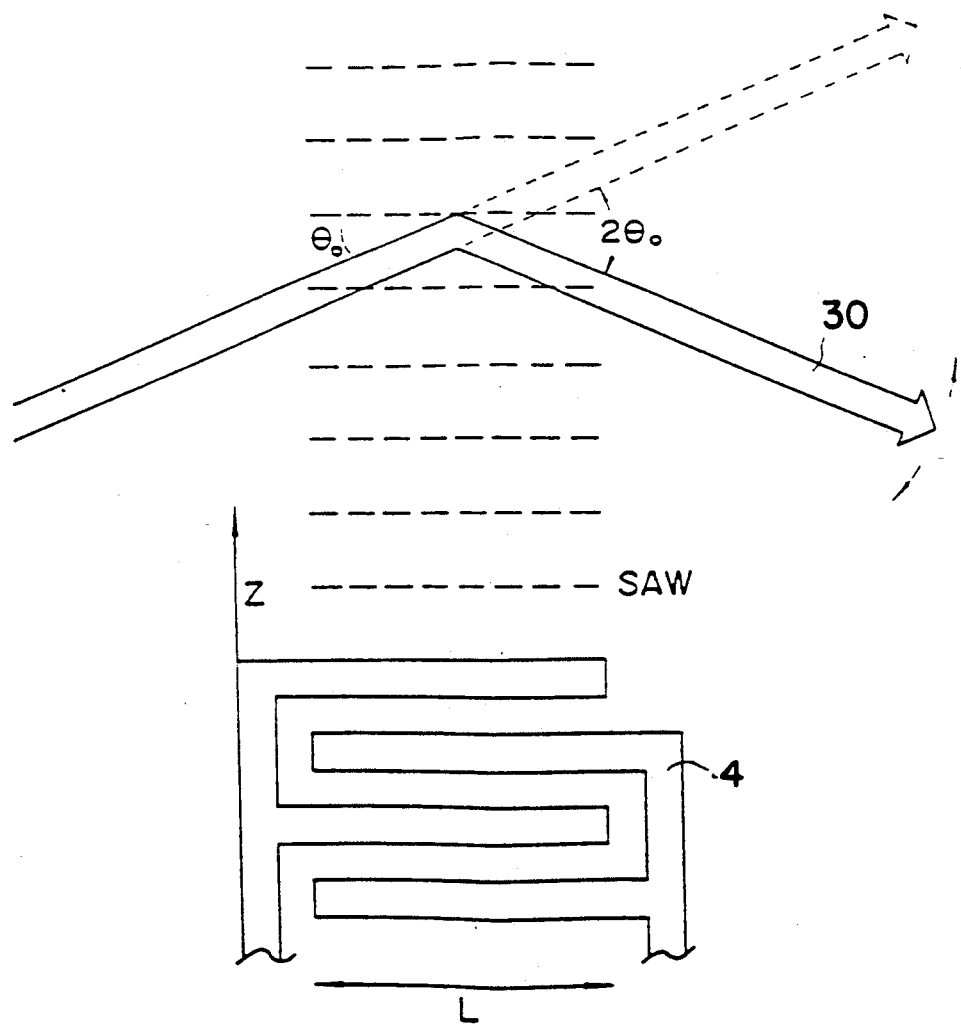
FIG. 3 is a view for explanation of Bragg diffraction of a light beam by an elastic surface wave which is one of essential parts of the first embodiment device.

The surface acoustic wave generating portion 4 comprises an interdigital electrode supersonic oscillator (IDT) to propagate a surface acoustic wave (SAW) towards a propagation path through which the light beam passes. FIG. 3 shows the light beam crossing the wave surface acoustic wave (SAW) at a Bragg angle $\theta_0$. Letting $\lambda$ be the wavelength of laser beam, $\Lambda_0$ be the wavelength of the surface acoustic wave, and n be the refractive index of the transmission path, then $$\sin \theta_0 = \lambda/2n\Lambda_0$$

and if this condition is satisfied, the laser light is fully reflected by the wave surface of the surface acoustic wave of suitable amplitude and the moving direction of the laser beam is varied through $2\theta_0$.

Since the region where the wave surface of the surface acoustic wave SAW is present is limited to the cross width L of an electrode of IDT4 of SAW generator as shown in FIG. 3, the period construction of incidental change in refractive index is limited in the same range. Thus, the surface acoustic wave limited in said width cannot be represented by the wave which propagates only in one direction different from the infinitely spread surface acoustic wave but is represented by the superposition of innumberable plane waves different in propagation direction from one another. When the frequency applied to the IDT4 is decreased from $f_0$ to $f_1$, the period $\Lambda_1$ of the surface acoustic wave to be generated becomes larger than $\Lambda_0$, and a laser beam 30 incident at angle $\theta_0$ is not satisfied with the Bragg condition relative to the period $\Lambda_1$. However, the surface acoustic waves limited in width as previously discussed include the surface acoustic waves having various propagation direction, and therefore, the Bragg condition $$\sin \theta_1 = \lambda/2n\Lambda_1$$

is satisfied relative to the wave in a specific direction, and the laser beam 30 is subjected to Bragg diffrection and the moving direction is varied through $2\theta_1$. Next, when the frequency of high frequency signal applied to the IDT4 is made to $f_2$ which is greater than $f_0$, the wave in a direction which is satisfied with the Bragg condition, $$\sin \theta_2 = \lambda/2n\Lambda_2$$

is present, and the laser beam 30 is diffracted in a direction deviated through $2\theta_2$ from the moving direction. In this manner, the illumination position of the laser beam can be controlled by light deflection under the Bragg diffraction. This can be utilized to direct a beam in a direction perpendicular to a track direction of a disc 8, as will be described later.

Figure 4:
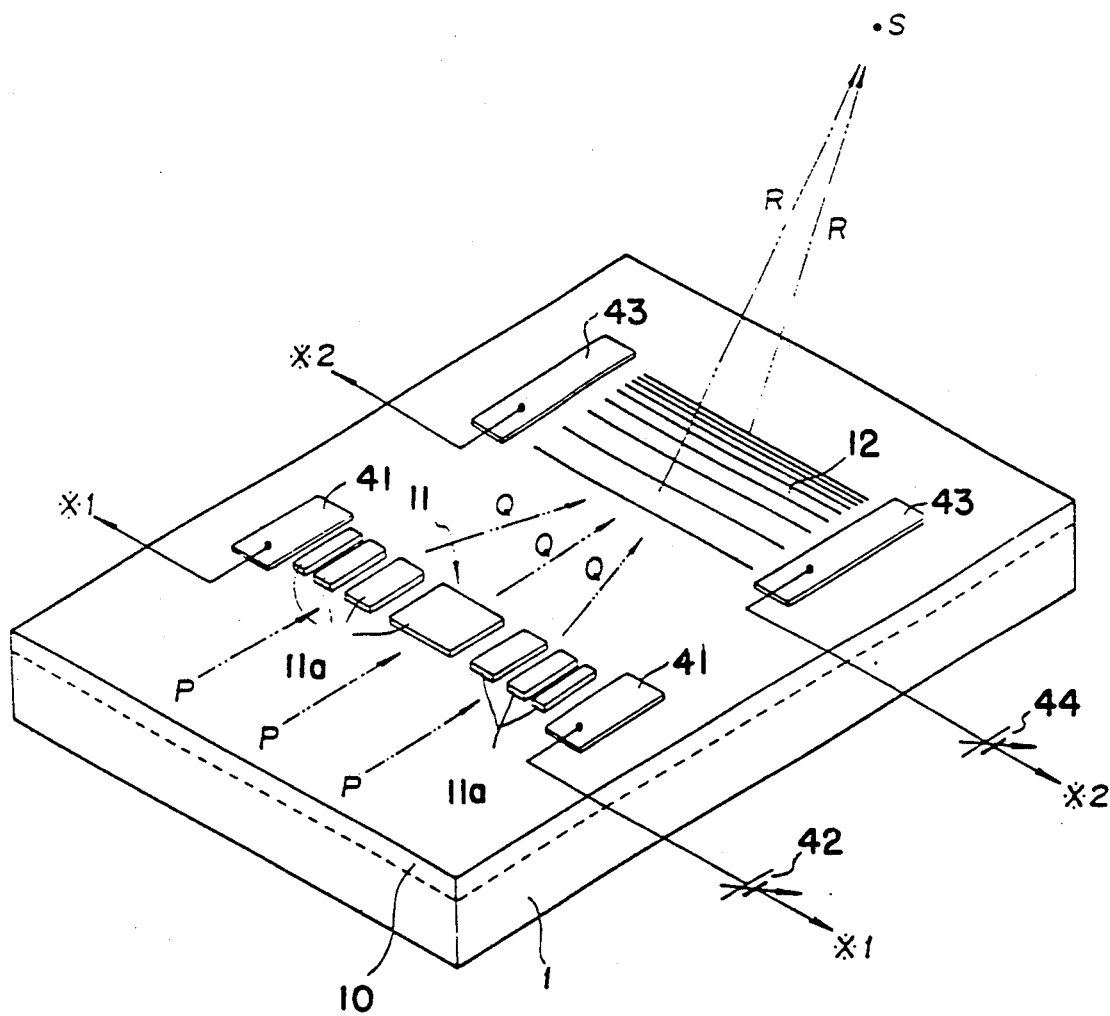
FIG. 4 is a perspective view showing, in relief, a lens portion which is one of essential parts of the first embodiment device.

The lens portion 5 is composed of a grating lens 11 and a chirp type grating 12 as shown in FIG. 4 in relief.

In FIG. 4, the grating lens 11 is constructed in such a way that an upper layer 11a is evaporated on the transmission path 10 into a fixed pattern by selective spattering using a lift-off method. The grating lens 11 is formed on its both sides with electrodes (coplanar electrodes) 41,41, between which is applied with a suitable voltage from a DC power source 42. Incident upon the grating lens 11 is a light which propagates in parallel in the transmission path 10 as indicated by the arrow P to focus said light within the plane of the transmission path 10 as indicated by the arrow Q.

The chirp type grating 12 different in period depending on location is formed on the transmission path 10 on the side where the light beam Q having passed through the grating lens 11 is moving by a holographic exposure method and an ion spattering method. The chirp type grating 12 is formed on its both sides with electrodes 43,43, between which is applied with a suitable voltage from a DC power source 44.

A light beam which propagates in the transmission path 10 as in the arrow Q and is incident on the chirp type grating 12 is projected obliquely upwardly from the surface of the transmission path 10 as shown by the arrow R, and focusing is effected within the plane vertical to the plane of the transmission path 10.

In the following, the operation of the above-described costruction will be described in detail. First, the details of function of the grating lens 11 will be described with reference to FIG. 5 with said portion depicted in relief. This grating lens 11 is designed so as to focus at a point B on the transmission path 10. The distance f to a position where the beam light from the grating lens 11 is condensed is in the relation represented by $$\Delta n \propto \cos [\beta\{(D/2)^2+f^2\}^{\frac{1}{2}}-f] \qquad (1)$$

where $\Delta n$ represents the change in refractive index from the base plate 1 of the transmission path 10 and $D/2$ the distance from the center of the grating lens 11, in the fresnel type grating lens 11. Here, $\beta$ represents the phase constant of mode in the transmission path 10. When a voltage is applied from a power source 42 to the electrodes 41 between which is sandwiched the grating lens 11, the phase constant $\beta$ of mode varies. The focal distance f of the grating lens 11 can be varied with the variation of the phase constant $\beta$. If a spacing between the electrodes 41,41 is greater by about one digit or position than a film thickness of the transmission path 10, the amount of variation of the phase constant $\beta$ is proportional to the voltage applied between the electrodes 41,41, and the variation in refractive index $\Delta_n$ is constant. That is, since the relation of D/2 << f is present, $$\beta[\{(D/2)^2+f^2\}^{\frac{1}{2}}-f]=\text{constant}$$

is obtained from the formula (1), and the relation of $\beta/f$=constant results. If the phase constant $\beta$ increases, the focal distance f also increases proportional to $\beta$, and moves, for example, to a point C of FIG. 5. If the phase constant $\beta$ decreases at a certain voltage, the focal point moves to a point A. In this manner, the parallel laser beam incident as indicated by the arrow P is focused within the plane of the transmission path 10 by the grating lens 11, and the focal distance thereof can be varied by regulating the voltage applied to the electrodes 41,41 to vary the refractive index of the grating lens 11.

Next, the function of the chirp type grating 12 will be described with reference to FIG. 6 which shows only the said portion in detail. The chirp type grating 12 formed on the transmission path over the length L is different in period depending on location, and the laser light entered the transmission path 10 as indicated by the arrow Q is projected outside at the grating 12, but the projection direction is different depending on location of projection thereof, as a cosequence of which the projected light is condenses at a certain point.

Figure 6:
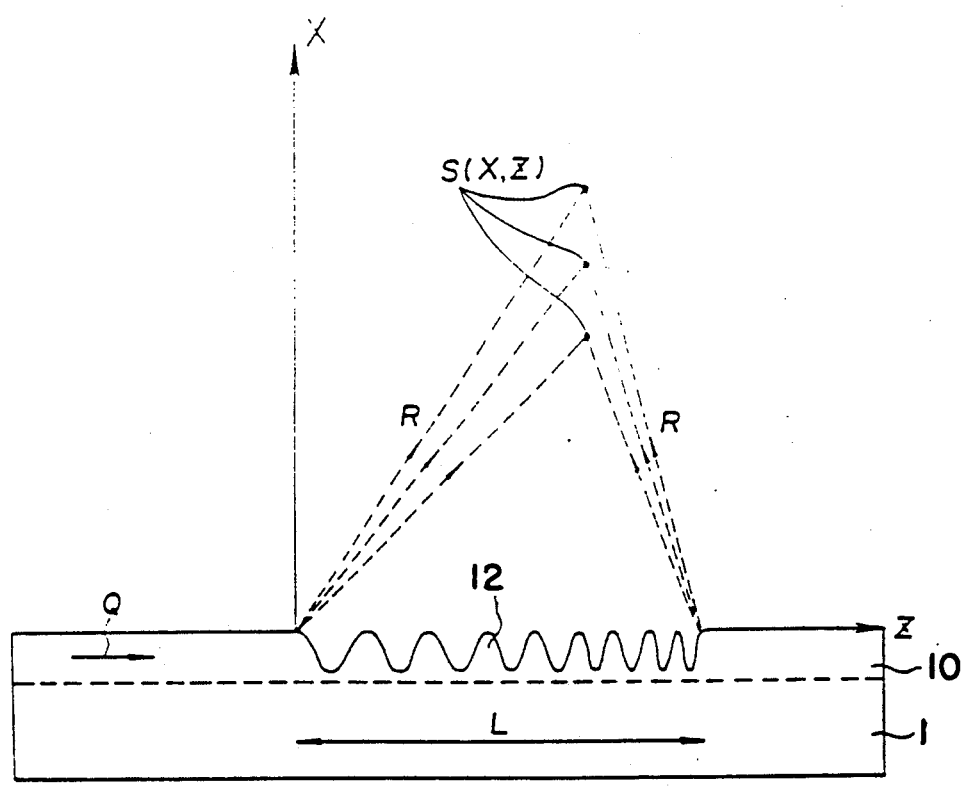
FIG. 6 is a side view showing the state of projection and condensation of light beams by a chirp type grating which constitutes said lens portion.

In the coordinate system as shown in FIG. 6, S(X,Z) assumes points as represented by $$Z = \frac{\beta_{0L}(k^2-\beta_L^2)^{\frac{1}{2}}}{\beta_0(k^2-\beta_L^2)^{\frac{1}{2}}-\beta_0(k^2-\beta_0^2)^{\frac{1}{2}}}$$

$$X=[(k^2-\beta_0^2)^{\frac{1}{2}}/\beta_0]Z\lambda$$

where $k(=2\pi/\lambda)$ represents the number of waves, and the following are obtained:

$$\beta_0 \equiv kz(O)=\beta-2\pi/\Lambda(O)$$

$$\beta_L \equiv kz(L)=\beta-2\pi/\Lambda(L)$$

Further, $\beta$ represents the phase constant of mode of the transmission path 10. $\Lambda(0)$ represents the period of the grating 12 in Z=0, and $\Lambda(L)$ represents the period of the grating 12 in Z=L. Assuming that the period of the grating 12 is 0.33 $\mu$m in Z=0 and 0.295 $\mu$m in Z=L, and if L=1 cm, and $\Lambda$=0.6328 $\mu$m, then S(X,Z)$\approx$(4.05,1.28)(cm in unit).

In formation of the grating 12, if PMMA is used as a resist and an electron beam exposing machine controlled by a microcomputer is used, it is possible to obtain a suitable period simply.

The focal point of the chirp type grating 12 can be moved by applying a voltage between the electrodes 43,43 and varying the refractive index of the transmission path 10 between the electrodes 43,43 and the phase constant of mode. It can be considered that the movement of the focal point linearly varies vertically to the surface of the transmission path 10 at the aforesaid point S. From the foregoing, it is possible to make focusing at the surface vertical to the surface of the transmission path 10 and movement of focal points.

By the aforementioned focusing of two systems, the two-dimensional focusing similar to the normal lens can be made and the focal position can be controlled electrically.

As described above, deflection of light beam by the surface acoustic wave SAW from the IDT4, focusing on the transmission path 10 the grating lens 11 and focusing of projected beam by the chirp type grating 12 can be adjusted by the frequency applied to the IDT4, voltage applied to the electrode 41, and voltage applied to the electrode 43, respectively, by combination of which the illumination position and focusing position of the beam projected from the chirp type grating 12 and illuminated on the surface of the disc 8 can be controlled. By these controls, the light beam is properly illuminated on the required track of the surface of the disc 8 and the reflected light may incident on the light receiving portion 6 provided on the same base plate 1.

Assuming for example in FIG. 1 that the diameter of beam at the grating 12 is 1 mm, the angle of incidence on the center of beam to the disc 8 is 30 degrees, and the spacing between the disc 8 and the surface of the base plate 1 is 1.5 mm, the diameter of the reflected beam from the disc 8 incident on the light receiving portion 6 is 1 mm, and routes of the incident beam and of the reflected beam are not superposed and no return incidence on the laser diode 2 occurs.

The light receiving portion 6 comprises photodiodes A1, A2, B1, B2, C1 and C2 which are obtained by dividing said light receiving portion into six sections. More specifically, the light receiving portion is divided into two groups in the radial direction of the disc 8, one group of A1, B1 and C1, and the other of A2, B2, and C2, and divided into three sections in the track direction of the disc 8, a set of A1 and A2, a further set of B1 and B2 and another set of C1 and C2. Among six diodes, two photodiodes B1 and B2 positioned in the center in the track direction of the disc 8 are made smaller than the others. A focus error signal to know a deviation in focal point of the light beam with respect to the surface of the disc 8 track error signal to know how much the center of a pit 13 and the center of beam are deviated in the track direction and a RF signal (data signal) to know the strength of beam are obtained by the outputs of these six photodiodes.

Let A1~C2 be the output levels of the photodiodes, the output Vf of the focus error signal is given by $$Vf=(B1-B2)-(A1+A2+C1+C2).$$

Figure 7:
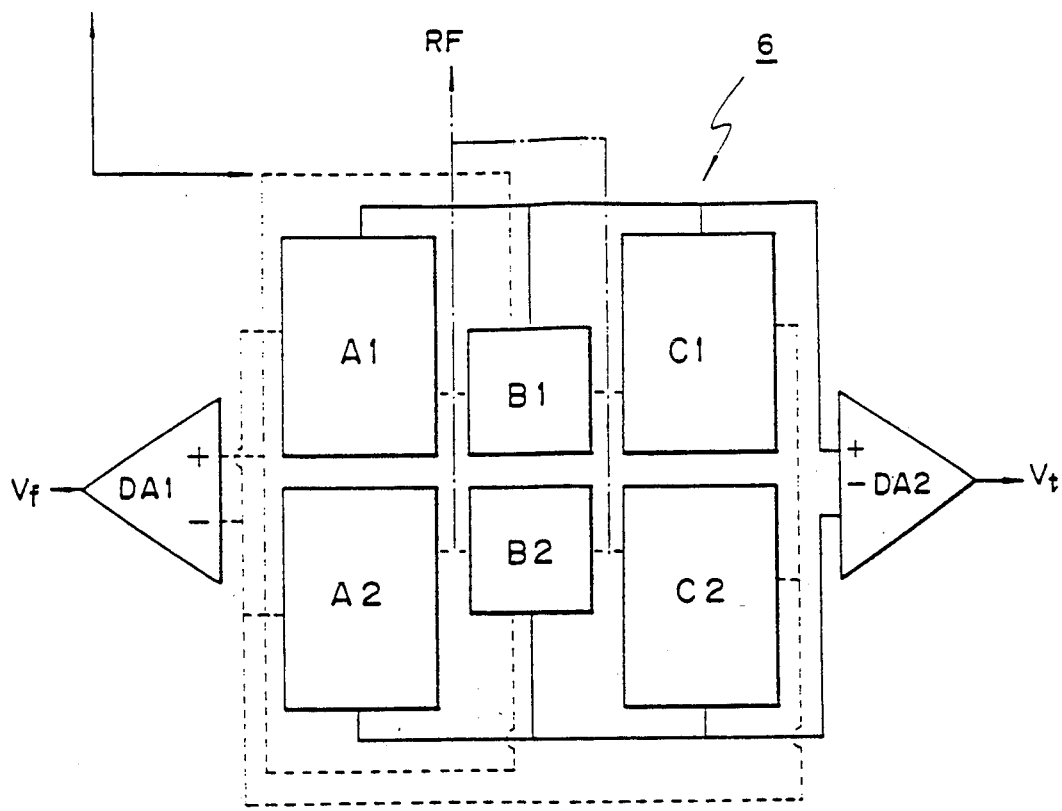
FIG. 7 is a view showing the construction of a light receiving portion in said first embodiment device.

This output Vf is obtained from a differential amplifier DA1 in FIG. 7.

Figure 8:
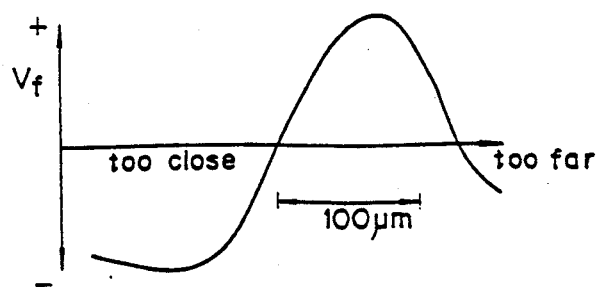
FIG. 8 is a view showing output characteristics of focus error signal corresponding to said light receiving portion.

The output characteristic of the focus error signal is given as shown in FIG. 8. At the combined position of focal point, the photodiodes B1 and B2 are smaller in size than the others so that the output assumes 0. As the focal point of beam comes close to the surface of the disc 8, the diameter of beam is enlarged on the light receiving portion 6, and therefore, the outputs of the photodiodes B1 and B2 decrease whereas the outputs of the photodiodes A1, A2, C1 and C2 increase. Thereby the focus error signal Vf is negative (−). Conversely, when the focal point moves away from the disc 8, the diameter of beam on the light receiving portion 6 decreases to increase the outputs of the photodiodes B1 and B2, and therefore, the focus error signal Vf is positive (+). This focus error signal Vf is obtained at the control portion 7, the aforesaid control voltages applied to the electrode 41 and electrode 43 are regulated on the basis of said error, and the focal point of the beam is properly adjusted to the surface of the disc 8. This is so-called focus servo.

Also, the track error signal Vt is given by $$Vt=(A1+B1+C1)-(A2+B2+C2).$$

This track error signal Vt is obtained from a differential amplifier DA2 in FIG. 2. If the center of beam on the light receiving portion 6 is present in the central portion of the group of photodiodes A1, B1 and C1 and the group of A2, B2 and C2, the signal output Vt is 0, but if it is deviated from the central portion towards either group, the output of said group increases whereas the output of the other decreases. For example, when the center of beam is deviated in the direction of the group of photodiodes A1, B1 and C1, that is, upwardly in the radial direction of the disc in FIG. 7, the output of said group increases and the output of "2" group decreases and therefore, the track error signal Vt is a certain positive (+) value. If the center of beam is deviated in the direction opposite to the former, the track error signal Vt is a negative (−) value, and the distance deviated can be known from the magnitude of the respective signals. This track error signal Vt is also obtained at the control portion, and the frequency applied to the IDT 4 on the basis of said error signal is controlled whereby so-called track servo is controlled.

A digital data signal represented by the pit 13 of the disc 8 is detected as a change in intensity of reflected light, and thus, the total value of output of all the devided photodiodes of the light receiving portion 6 is made to be the RF signal (data signal).

The aforesaid control portion 7 is integrated on the silicon base plate 1 and includes a micro-computer and the like to control the aforementioned focus servo and track servo, and in addition, carries out various controls and signal processing for properly reading data from the disc 8.

Figure 9:
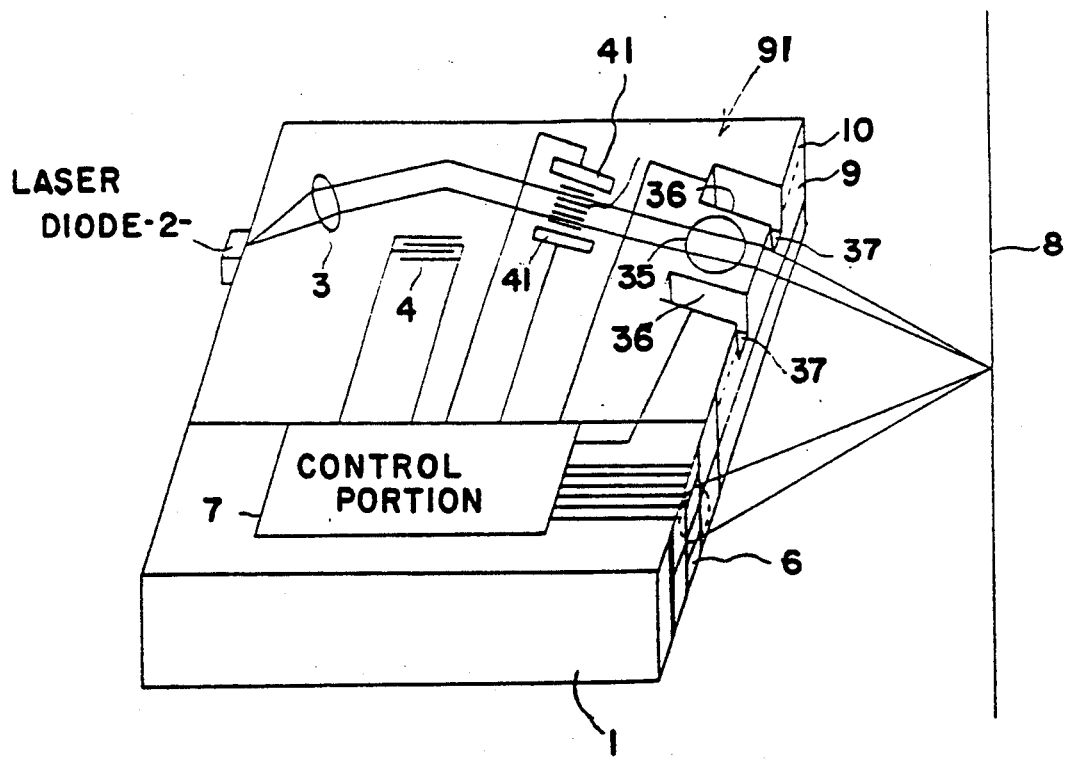
FIG. 9 is a perspective view showing the pickup in accordance with the second embodiment of the present invention.

FIG. 9 shows a pickup in accordance with the second embodiment of the present invention. The same part as those in the first embodiment bear the same reference numerals, the description of which will be omitted (the same is true for the following third embodiment).

The pickup in accordance with the second embodiment is provided with a lens portion 91 which can project a laser beam from the side end of the silicon base plate 1, and the aforesaid light receiving portion 6 is disposed on the same side.

The lens portion 91 is composed of said grating lens 11 and an integrated lens 35.

That is, the light beam having passed through the grating 11 is incident on the integrated lens 35 for projection of transmission light formed on the side end of the transmission path 10, and the light is projected from the side end of the transmission path 10 by said lens 35.

This lens 35 comprises a region of high refractive index wherein titanium is thermal diffused and formed into a substantially semi-sperical configuration of suitable depth from the surface of the transmassion path 10, the refractive index being varied with a voltage applied between electrodes 36 and 36 provided on the both sides thereof. The electrodes 36 and 36 are bored with grooves 37 and 37 parallel to the transmission path 10, and aluminum is evaporated in opposed walls thereof.

Figure 10A:
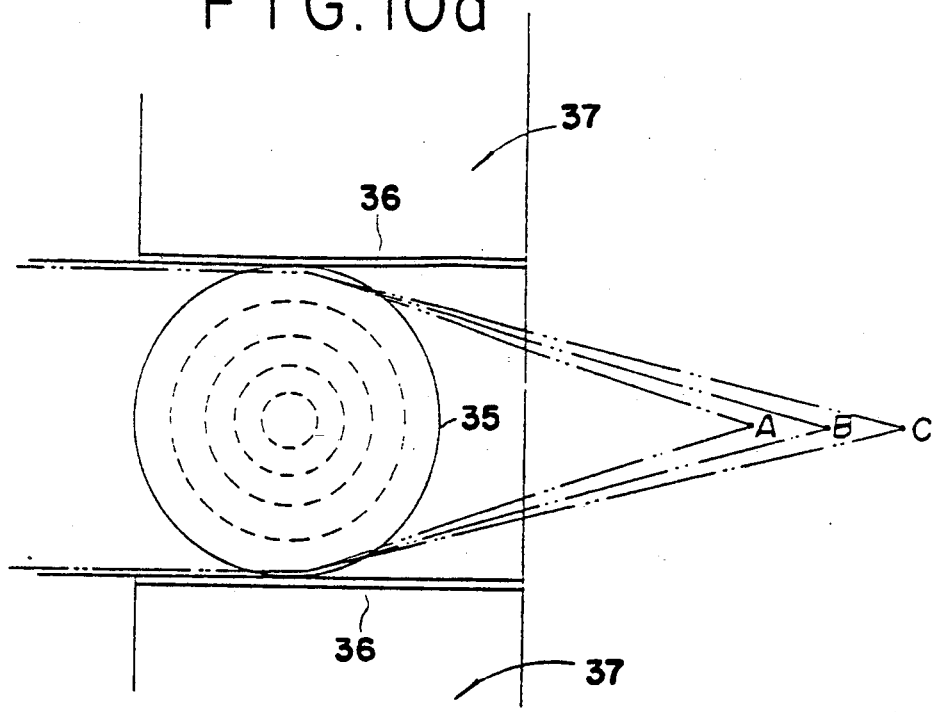
FIGS. 10(a) and 10(b) are views showing projection and condensation of light beams in a plane direction by an integrated lens which constitutes a lens portion as one of essential parts of said second embodiment device, FIG. 10 (a) being a plane view and FIG. 10 (b) a side view.
Figure 10B:
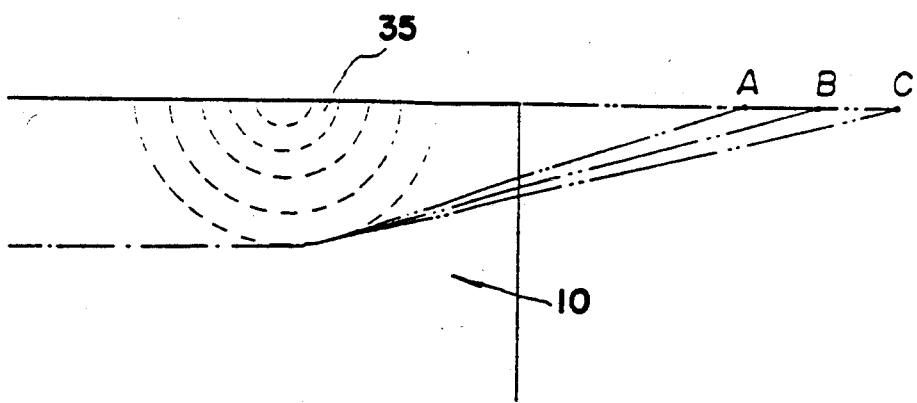

FIGS. 10 (a) and 10 (b) show the control of focal point effected within a plane of the transmission path 10 by the voltage applied between the electrodes 36 and 36. A point B denotes a focal point where voltage is not applied. When the applied voltage is controlled to increase the refractive index of the lens 35, the focal point is moved to point A, and when the refractive index decreases, the focal point is moved to a point C. The two-dimentional focusing can be made by the lens 35 and said grating lens 11.

Figure 11:
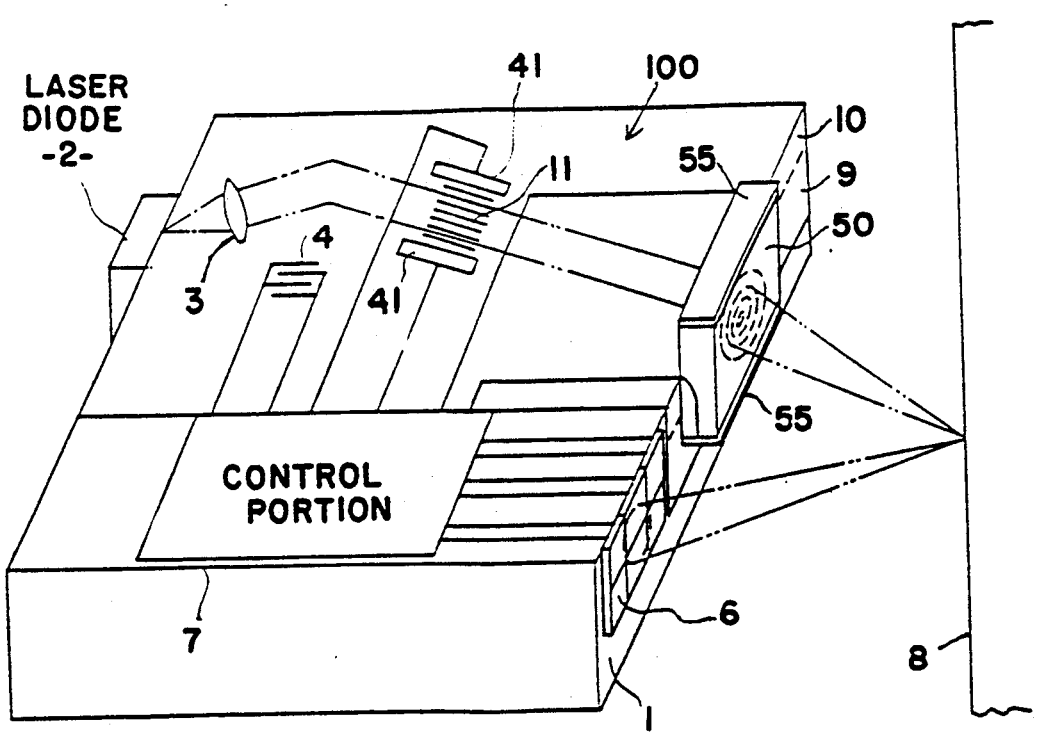
FIG. 11 is a perspective view showing the pickup in accordance with the third embodiment of the present invention.

FIG. 11 shows a pickup in accordance with the third embodiment of the present invention.

Figure 12:
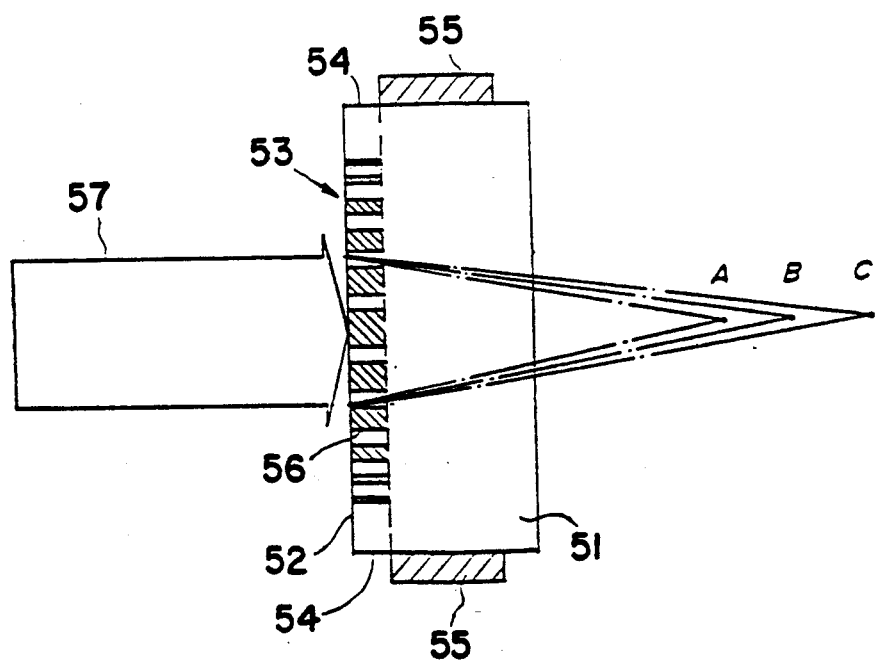
FIG. 12 is a view showing the state of projection condensation of light beams in a plane direction by an integrated lens which constitutes a lens portion as one of essential parts of said third embodiment.

The pickup of this third embodiment functions similar to the second embodiment. To constitute a lens portion 100, a lens 50 in place of the aforementioned integrated lens 35 is joined to the end surface of the silicon base plate 1. This integrated lens 50 is constructed such that as shown in FIG. 12, a Fresnel lens portion 53 is provided on a light receiving surface 53 of a base plate (LiNbO$_3$) 51 having a fixed thickness, and electrodes 55, 55 are provided on a pair of side 54 perpendicular to said light receiving surface 52.

In the Fresnel lens portion 53, As$_2$S$_3$ is evaporated on the light receiving surface 52, and a required refractive index distribution region 56 is concentrically circularly formed in the evaporated film by an electron beam exposure, said region 56 serving as a Fresnel lens.

The electrodes 55, 55 are formed by evaporation in a portion with said refractive index distribution region 56 removed.

The integrated lens 50 operates as follows: In FIG. 12, it is designed so that a light beam 57 projected from the end of the transmission path 10 is condensed at a point B outside the base plate 51 by the lens portion 53. At this time, condesing operation of the lens portion 53 is uniformaly carried out within a section of the light beam 57. Thus, a condensed spot at the point B is circular in shape. A voltage applied between the electrodes 55 and 55 is varied and the refractive index of the base plate 51 between the electrodes 55 and 55 is varied by said change in electric field. That is, the refractive index of the base plate 51 can be varied to thereby move the position of focal point from point B to point C and from point B to point A.

What is claimed is:

1. A pickup for an optical type digital disc comprising the following portions integrated together on a base plate formed on its surface with a light transmission path which forms a first plane;

a light emitting portion for propagating a light beam to said light transmission path;

a surface acoustic wave generating portion for propagating a surface acoustic wave on said light transmission path to deflect said light beam within said first plane of said light transmission path;

means for projecting said light beam outside said light transmission path, but within said first plane including: a) lens means for effecting two-dimensional focusing of said beam which has been deflected by the surface acoustic wave generating portion, and adjustment of its focal position, wherein said lens means comprises a grating lens formed on the transmission path to focus the light beam propagating on the light transmission path within a focusing portion in the plane of the transmission path, b) electrodes formed on said transmission path in the neighborhood of said grating lens to vary a refractive index of said grating lens in response to an applied voltage, c) an integrated lens formed in said transmission path in said focusing portion to project the light beam having passed through said grating lens outside said transmission path in an oblique direction, and d) electrodes for varying the refractive index of said integrated lens;

a light receiving portion comprising a combination of a plurality of light receiving elements disposed at suitable intervals from the projected position of said light beam to receive a reflected light of said light beam; and control means for receiving an output of said light receiving portion to process a signal and supplying control signals to the surface acoustic generating portion and said electrodes of said projecting means, thereby effecting control of a deflection angle of the light beam, two-dimensional focusing of the projected beam and control of focal position.

2. An optical pickup for a data storage medium, comprising:

light emitting means for projecting a light beam;

a base plate, optically coupled to said light emitting means, and formed with a light transmission path thereon defining a first plane, which receives said light beam and transmits said light beam along said light transmission path;

grating means, disposed in said first plane for diffracting said light beam out of said first plane obliquely upwardly from said first plane to a data storage medium disposed above said light emitting means; and light receiving means, disposed in said first plane, for receiving a light of said light beam that is reflected from said data storage medium.

3. An optical pickup for a data storage medium according to claim 2, said light emitting means being formed on said base plate and further comprising a second base plate which is in said first plane and coplanar with said first base plate on which said light receiving means is provided.

4. An optical pickup for a data storage medium according to claim 2, wherein both of said light emitting means, and said light receiving means are formed on said base plate.

5. An optical pickup as in claim 2, further comprising a first lens grating, located in said first plane between said light emitting means and said grating means, for focusing said light beam within said first plane into an area of focus; wherein said grating means is located at said area of focus.

6. An optical pickup as in claim 2, wherein said grating means is a chirp type grating.

7. An optical pickup as in claim 5, further comprising means for varying said area of focus of said first lens grating.

8. An optical pickup for a data storage medium, comprising:

a base plate, formed with a light transmission path thereon defining a first plane;

light emitting means for projecting a light beam into said light transmission path in said first plane;

grating means, located in said first plane, for projecting said light beam outside said first plane and toward the data storage medium disposed above said light emitting means at an oblique direction; and light receiving means, located in said first plane, for receiving a light beam reflected from said data storage medium at another oblique direction.

9. An optical pickup as in claim 8 wherein said light emitting means includes a surface acoustic wave generating portion for propagating a surface acoustic wave on said light transmission path to deflect said light beam therewithin.

10. An optical pickup for a data storage medium, comprising:

a pickup substrate, having an upper surface adjacent and below the storage medium, said upper surface defining a first plane therealong;

light emitting means for projecting a light beam along said first plane;

a first lens grating, located in said first plane, for focusing said light beam within said first plane into an area of focus within said first plane;

a second chirp grating, located in said first plane within said area of focus, for diffracting said light beam out of said first plane in an oblique direction, and toward the storage medium such that the light incident on the storage medium is reflected from the storage medium in another oblique direction and toward said first plane; and light receiving means for receiving a light of said light beam that is reflected from said data storage medium at said slanted direction.

11. An optical pickup for data storage medium according to claim 10, wherein said light receiving means is located in said first plane.

* * * * *